(12) United States Patent
Humeida et al.

(10) Patent No.: US 11,438,275 B2
(45) Date of Patent: Sep. 6, 2022

(54) CONGESTION RESPONSE

(71) Applicant: BRITISH TELECOMMUNICATIONS PUBLIC LIMITED COMPANY, London (GB)

(72) Inventors: Yousif Humeida, London (GB); Stephen Appleby, London (GB); Michael Nilsson, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/266,337

(22) PCT Filed: Aug. 8, 2019

(86) PCT No.: PCT/EP2019/071310
§ 371 (c)(1),
(2) Date: Feb. 5, 2021

(87) PCT Pub. No.: WO2020/030736
PCT Pub. Date: Feb. 13, 2020

(65) Prior Publication Data
US 2021/0297358 A1   Sep. 23, 2021

(30) Foreign Application Priority Data
Aug. 8, 2018 (EP) .................................. 18187940

(51) Int. Cl.
*H04L 12/841* (2013.01)
*H04L 12/26* (2006.01)
(Continued)

(52) U.S. Cl.
CPC ........ *H04L 47/283* (2013.01); *H04L 43/0864* (2013.01); *H04L 47/27* (2013.01)

(58) Field of Classification Search
CPC .... H04L 47/283; H04L 47/27; H04L 43/0864
See application file for complete search history.

(56) References Cited

U.S. PATENT DOCUMENTS

| 8,125,910 B2 * | 2/2012 | Shimonishi | ......... H04L 47/2416 370/252 |
| 8,724,475 B2 * | 5/2014 | Prescott | ................ H04L 41/147 370/241 |

(Continued)

FOREIGN PATENT DOCUMENTS

| CN | 105471757 | 4/2016 |
| GB | 2559271 | 8/2018 |
| WO | 2018/121990 | 7/2018 |

OTHER PUBLICATIONS

International Search Report and Written Opinion of the ISA for PCT/EP2019/071310, dated Sep. 4, 2019, 13 pages.

(Continued)

*Primary Examiner* — Rasheed Gidado
(74) *Attorney, Agent, or Firm* — Nixon & Vanderhye P.C.

(57) ABSTRACT

In examples of the present invention, during delivery of content, the round trip times for each delivered data packet are measured and the congestion window used for delivery is adjusted accordingly. The congestion window is set to a relatively high value when the round trip times are relatively low, and set to a relatively low value when the round trip times are relatively high.

20 Claims, 6 Drawing Sheets

(51) Int. Cl.
*H04L 47/283* (2022.01)
*H04L 43/0864* (2022.01)
*H04L 47/27* (2022.01)

(56) References Cited

U.S. PATENT DOCUMENTS

| | | | |
|---|---|---|---|
| 8,830,852 B2* | 9/2014 | Kikkawa | H04L 47/27 |
| | | | 370/252 |
| 9,906,453 B2* | 2/2018 | Vincent | H04L 47/34 |
| 10,594,568 B2* | 3/2020 | Zhang | H04W 24/08 |
| 11,140,205 B2* | 10/2021 | Nilsson | H04L 69/326 |
| 2005/0165923 A1* | 7/2005 | Miyake | H04N 19/91 |
| | | | 709/223 |
| 2006/0171313 A1* | 8/2006 | Shimonishi | H04L 47/10 |
| | | | 370/465 |
| 2015/0236966 A1* | 8/2015 | Francini | H04L 43/0864 |
| | | | 370/235 |
| 2016/0164785 A1* | 6/2016 | Flores | H04L 47/27 |
| | | | 370/237 |
| 2017/0118119 A1 | 4/2017 | Testicioglu et al. | |

OTHER PUBLICATIONS

Extended EP Search Report for GB18187940.4, dated Jan. 2, 2019, 8 pages.
Examination Report for GB 1911310.9, dated Jun. 24, 2020, 3 pages.
Search Report for GB1911310.9, dated Jan. 23, 2020, 4 pages.
Combined Search and Examination Report for GB1812862.9, dated Dec. 21, 2018, 5 pages.

* cited by examiner

CONGESTION RESPONSE

This application is the U.S. national phase of International Application No. PCT/EP2019/071310 filed 8 Aug. 2019, which designated the U.S. and claims priority to EP Patent Application No. 18187940.4 filed 8 Aug. 2018, the entire contents of each of which are hereby incorporated by reference.

TECHNICAL FIELD

This invention relates to a method and apparatus for managing the congestion response during the delivery of content over a network.

BACKGROUND

The Transmission Control Protocol (TCP) is a transport protocol used in the delivery of data over a distributed computer network like the internet.

TCP was designed to achieve reliable transmission of data over a network with an aim of avoiding adversely affecting the network throughput of competing TCP traffic flows. In accordance with the TCP protocol, packets that are lost in transmission are retransmitted in an attempt to achieve reliable delivery. In addition, the TCP protocol implements a congestion response, or congestion avoidance, scheme. As part of this scheme, the transmission rate of packets from a sender to a receiver over the network is typically reduced following a detected packet loss on the assumption that the packet loss was caused by congestion on the network.

The transmission rate of packets into the network may be controlled by a parameter known as the congestion window (which may be denoted herein as CWND). The congestion window may indicate the maximum permissible number of packets that at any given time have been communicated into the network but not yet acknowledged by the receiver. A TCP sender (e.g. a media content server) may maintain a congestion window for each receiver (e.g. a content client) connection or stream. Following a detected packet loss over a given connection, the TCP sender typically takes rapid action to significantly decrease the size of the congestion window, which results in a large reduction in the transmission rate for that connection. Implementations of TCP New Reno do this by a process known as additive increase multiplicative decrease.

When such a TCP stream flows through a router, for example, to transfer a large file, the transmission rate increases until the router queue fills, at which point a packet will be lost. In some router implementations, known as drop tail, packets are not lost until the queue is absolutely full. In other implementations, such as Random Early Discard, packets are lost with a probability that increases monotonically with buffer fill. However, usually, the probably of a packet loss due to buffer filling increases with buffer fill.

Consequently, as a router buffer fills, packets are lost, causing TCP to slow down the transmission rate by reducing the congestion window size. Afterwards, TCP will gradually increase the congestion window size as it receives acknowledgements until once again the router queue fills and packets are dropped.

FIG. 4 is a graph showing a typical example of the consequences of this behaviour over time on the TCP congestion window size (CWND), the buffer fill, and round trip time (RTT), for the case of a single TCP New Reno flow through a router with queue size of 100 packets, and packets of size 1500 bytes, a bottleneck throughput rate of 10 MBit/s, and 10 ms of RTT from sources other than queuing in the router. CWND is shown by the solid line plot 400 (and measured in packets), buffer fill is shown by the dashed line plot 402 (and measured in packets), and RTT is shown by the dot-dash line plot 404 (and measured in ms). It can be seen that each of these follows a saw-tooth shape.

The steady increase of congestion window size, buffer fill and round trip time is not quite linear, as the congestion window increases by one packet per round trip time, but the round trip time increases with the congestion window and buffer fill, making the interval between increments increase.

Popular implementations of TCP congestion control, such as TCP New Reno and TCP CUBIC, control the flow of data in response to packet loss, and thus cannot guarantee the delivery of a specified amount of data in a specified time interval.

The Applicant's International application WO2014/155031 describes TCP congestion control in which the TCP congestion window is controlled during the delivery of a segment of data to ensure that the segment of data is delivered within a specified time interval, and in which the packet loss is monitored during delivery, and in which the measured packet loss during the delivery of one or more preceding segments is used to calculate constraints on the congestion window to be used for delivery of the next segment of data.

For example, the specified time interval may be set to a relatively short time for content streaming applications where content needs to be delivered within a certain time to prevent play-out stalling. Conversely, for a file download, where a user does not require a file urgently, the specified time interval may be set to a relatively long time.

SUMMARY

According to one aspect of the present disclosure there is provided a method of delivering content from a server to a client over a network, said content comprising a plurality of temporal segments having an associated time available for delivery, and each temporal segment comprising a plurality of data packets, said method comprising:
 a) delivering a first portion of a segment from the server to the client;
 b) measuring a plurality of round trip times associated with delivery of at least the first portion;
 c) determining a current round trip time, a central round trip time, a lower round trip time, and an upper round trip time from the plurality of round trip times;
 d) calculating a required congestion window size needed to deliver the data remaining in the segment within the time available to deliver the data remaining in the segment, wherein the required congestion window size is dependent on the central round trip time;
 e) calculating a modified congestion window size, where the modified congestion window size falls within a range set around the required congestion window size, and where the modified congestion window size is relatively high when the current round trip time is close to the lower round trip time, and the modified congestion window size is relatively low when the current round trip time is close to the upper round trip time;
 f) delivering further data from the remainder of the segment using the modified congestion window size from the server to the client;
 g) measuring a plurality of round trip times associated with delivery of the further data from the remainder of the segment; and h) repeating steps c) to f) using at least the plurality of round trip times from step g).

The current round trip time may be the round trip time associated with delivery of the most recent packet.

The time available to deliver the data in the remainder of the segment may be the time available for delivery of the segment minus the time elapsed since data delivery started for the segment.

The modified congestion window size may fall between a minimum congestion window size and a maximum congestion window size that are set as a percentage offset from the required congestion window size.

The lower round trip time may be the lowest measured round trip times, and the higher round trip time may be the highest measured round trip times.

The modified congestion window size, $CWND_{modified}$, may be given by:

$$CWND_{modified} = CWND_{min} + (CWND_{max} - CWND_{min}) \times \frac{RTT_{high} - RTT_{current}}{RTT_{high} - RTT_{low}}$$

where $CWND_{min}$ is the minimum congestion window size, $CWND_{max}$ is the maximum congestion window size, $RTT_{high}$ is the higher round trip time, $RTT_{low}$ is the lower round trip time, and $RTT_{current}$ is the current round trip time.

According to a second aspect of the present disclosure there is provided a server for delivering content over a network to a client, said content comprising a plurality temporal segments having an associated time available for delivery, and each temporal segment comprising a plurality of data packets, said adapted in operation to:
  a) deliver a first portion of a segment from the server to the client;
  b) measure a plurality of round trip times associated with delivery of at least the first portion;
  c) determine a current round trip time, a central round trip time, a lower round trip time, and an upper round trip time from the plurality of round trip times;
  d) calculate a required congestion window size needed to deliver the data remaining in the segment within the time available to deliver the data remaining in the segment, wherein the required congestion window size is dependent on the central round trip time;
  e) calculate a modified congestion window size, where the modified congestion window size falls within a range set around the required congestion window size, and where the modified congestion window size is relatively high when the current round trip time is close to the lower round trip time, and the modified congestion window size is relatively low when the current round trip time is close to the upper round trip time;
  f) deliver further data from the remainder of the segment using the modified congestion window size from the server to the client;
  g) measure a plurality of round trip times associated with delivery of the further data from the remainder of the segment; and
  h) repeat c) to f) using at least he plurality of round trip times from g).

BRIEF DESCRIPTION OF THE DRAWINGS

For a better understanding of the invention reference will now be made by way of example only to the following drawings, in which.

DESCRIPTION OF PREFERRED
EMBODIMENTS

The present invention will now be described with reference to particular examples. The invention is not, however, limited to such examples.

Examples of the present invention present a method of delivering content from a server to a client over a network. The content could be media content such as a video sequence, or could be some other form of content such as a file transfer. The content comprises a plurality of temporal segments. For media content, each segment may contain data for a short temporal duration at playout (e.g. 2 to 15 playout seconds' worth of data). The number of data packets per segment of media content is dependent on the duration of the temporal segment, the encoded bit rate and the size of each data packet, and may range from several tens of data packets to thousands of data packets. For example, with a temporal segment of 10 s duration, an encoded bit rate of 1 MBit/s, and a data packet size of 1500 bytes, each media content segment of 10 s duration would comprise 833 data packets (10×1000000/(1500×8)).

In examples of the present invention, during delivery of content, the round trip times for each delivered data packet are measured and the congestion window used for delivery is adjusted accordingly. The congestion window is set to a relatively high value when the round trip times are relatively low, and set to a relatively low value when the round trip times are relatively high.

Example embodiments of the present disclosure will now be described. In the following examples, media content is delivered over a network in accordance with HTTP Adaptive Bit Rate Streaming, where the HTTP uses TCP with the modified TCP congestion response. However, examples of the invention could equally be applied to other content instead of media content, such as file transfers for operating system updates, games and applications. Typical examples of media content include films, news and TV shows.

Figure 1:
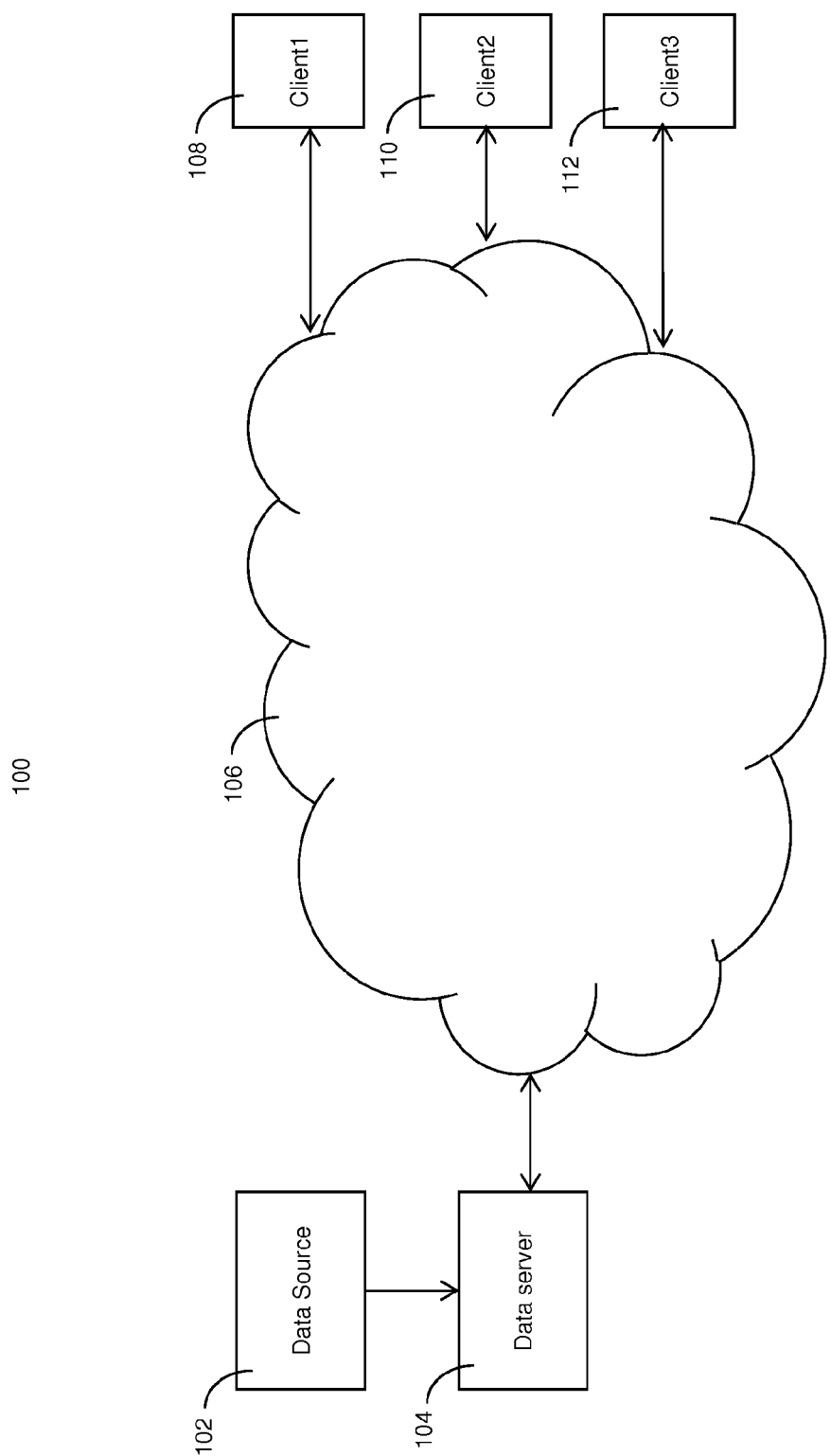
FIG. 1 shows an example of a communication network.

FIG. 1 shows an example of a communication system 100. The system comprises a data server 104 and a plurality of client devices or receivers 108, 110 and 112 separated by a communication network 106. The network 106 could be a wireless network, a wired network, or a combination of a wired and wireless network. The network 106 could be (or could form part of) a distributed computing network, such as the internet.

The data server 104 is shown communicatively coupled to a data source 102. The data source 102 provides data to the data server 104. As described above, in this example the data is media content comprising video and/or audio streams, though could be some other form of data. The data source 102 is thus a content generator configured to encode a video stream to generate an encoded video stream. The video content could for example be encoded according to the ITU-T H.264 standard, though other standards may also be used. If the media content additionally comprises audio content, then this may be encoded to generate an encoded audio stream. One example of the standard for encoding the audio stream is MPEG-4 HE AAC, but other standards may alternatively be used. The data source 102 may also be configured to segment the media content into a plurality of discrete temporal segments, which as described above are typically between 2 s and 15 s in duration. The content stream could be segmented before or after encoding.

The data server 104 is configured to receive the media content from data source 102 and may store the received content. As indicated above, the media content received by the data source 102 may be encoded and segmented. The data server may communicate, or deliver, the media content to one or more of the clients 108, 110 and 112 via the network 106. The data server 104 could be a video streaming server, and may deliver video (and/or audio) content on request to the clients. Thus, the client devices 108, 110 and 112 may be adapted to request media content from the server 104. The client devices could for example be a suitably configured set-top box, PC, laptop, smartphone, tablet, smart TV, etc.

Figure 2:
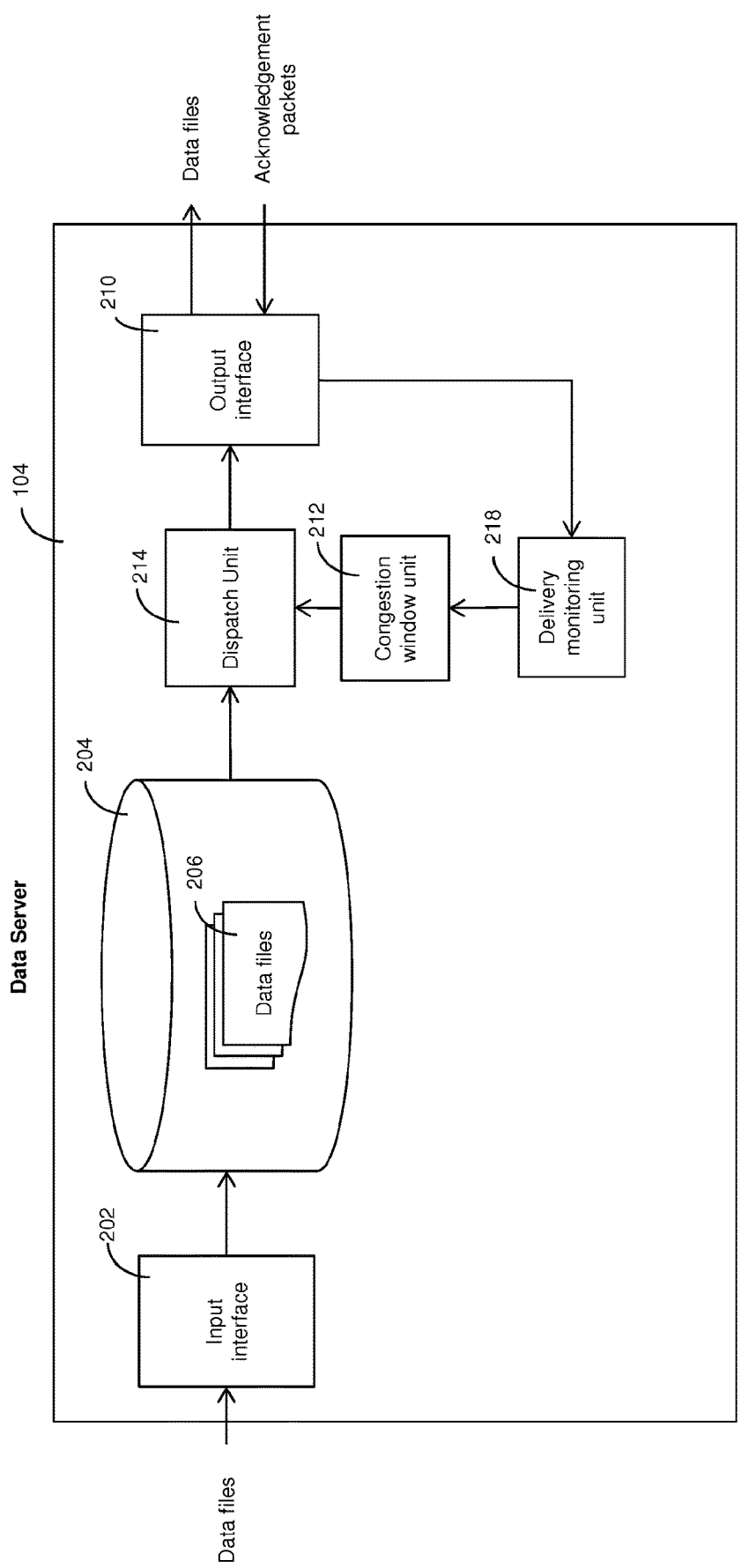
FIG. 2 shows an example of a data server forming part of the network in
  FIG. 1.

An example of the data server 104 is shown in more detail in FIG. 2.

The server 104 comprises an input interface 202; a data store 204 and an output interface 210. The server 104 further comprises a dispatch unit 214 coupled to the output interface 210, a congestion window unit 212 and a delivery monitoring unit 218. The server 104 may be configured to receive the encoded content segments from the data source 102 at the input interface 202 and to store the received encoded segments as data files 206 in the data store 204.

Each content segment is transmitted from the server 104 via the output interface 210 as a plurality of data packets. That is, each segment of content data is formed of a plurality of data packets. The number of data packets that make up a content segment can vary and depends on a number of factors as described earlier. The data server 104 may also receive via the output interface 210 acknowledgement packets from one or more content clients to which the server has transmitted data packets. The communication system may be arranged so that the content server receives an acknowledgement packet for each data packet successfully delivered to a client over the network.

Figure 4:
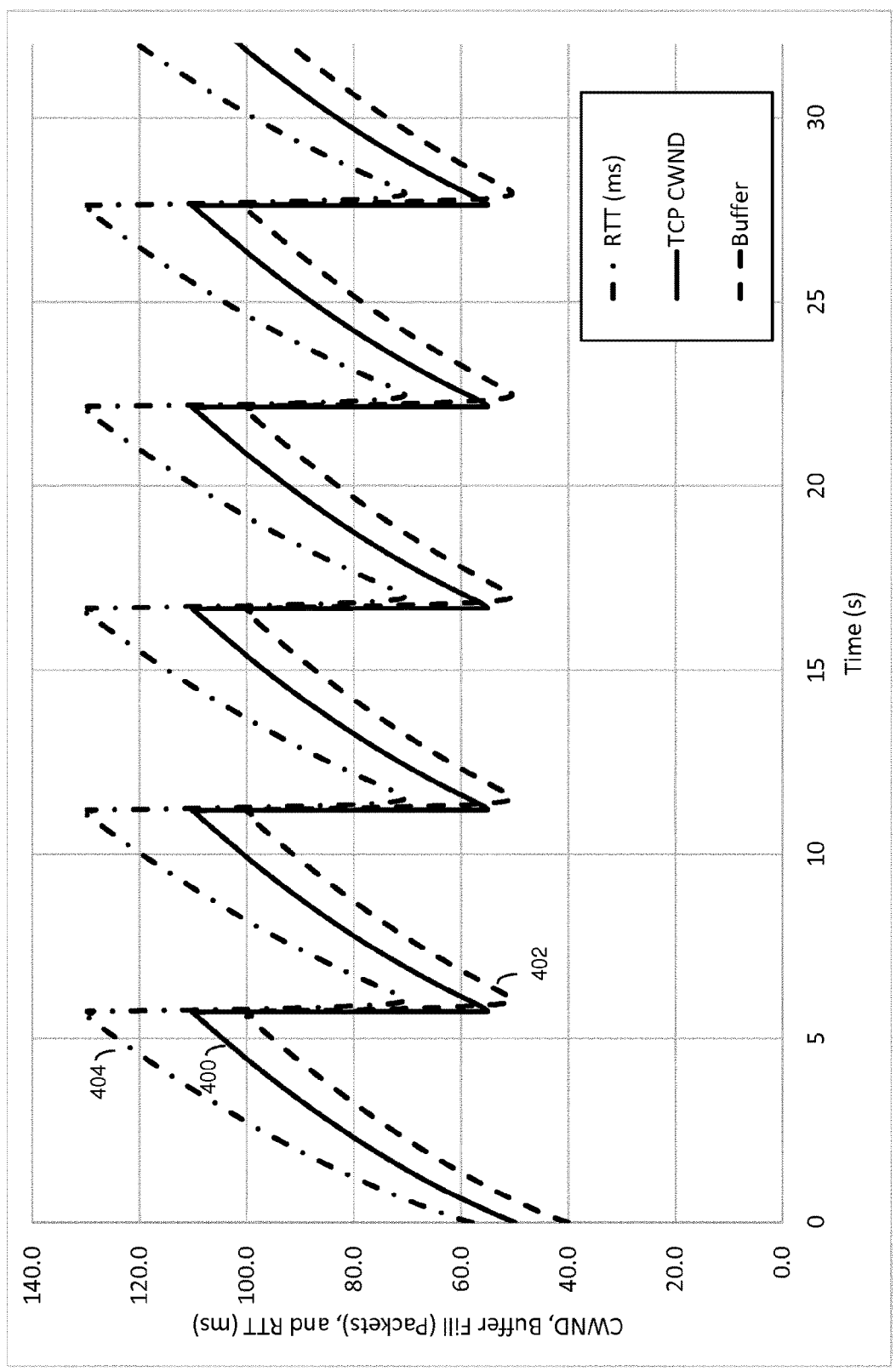
FIG. 4 is a graph showing the variation of congestion window size, buffer fill, and round trip time over time for an example TCP New Reno flow.

With reference to FIG. 1, consider the example of one flow from the data server 104 to the client 108, and a second flow from the data server 104 to the client 110 over the network 106, where the two flows complete for bandwidth over at least one part of the network 106. With reference to the TCP flow described earlier, the behaviour of which is illustrated in FIG. 4, it has been discovered that if there is a second flow competing with such a TCP flow, then the second flow could achieve better performance by transmitting at a higher rate when the buffer is less full and at a lower rate when it is fuller. A conventional TCP flow cannot do this as its transmission rate is controlled by its congestion window size, which in turn is controlled by packet loss events. However, a flow using an alternative modified congestion response can delay its response to packet loss events, and so has control over its transmission rate regardless of the packet loss rate. Examples of the present invention propose such a modified congestion response.

When using the network configuration described above, of two flows completing for bandwidth over at least one part of the network 106, it has been found in simulations that the throughput of the TCP New Reno flow was approximately the same as the throughput of a TCP flow with fixed congestion window size of 47 packets. The size of this fixed congestion window size was found by iterating over different values until the throughput achieved by each of the two flows was approximately the same.

Figure 5:
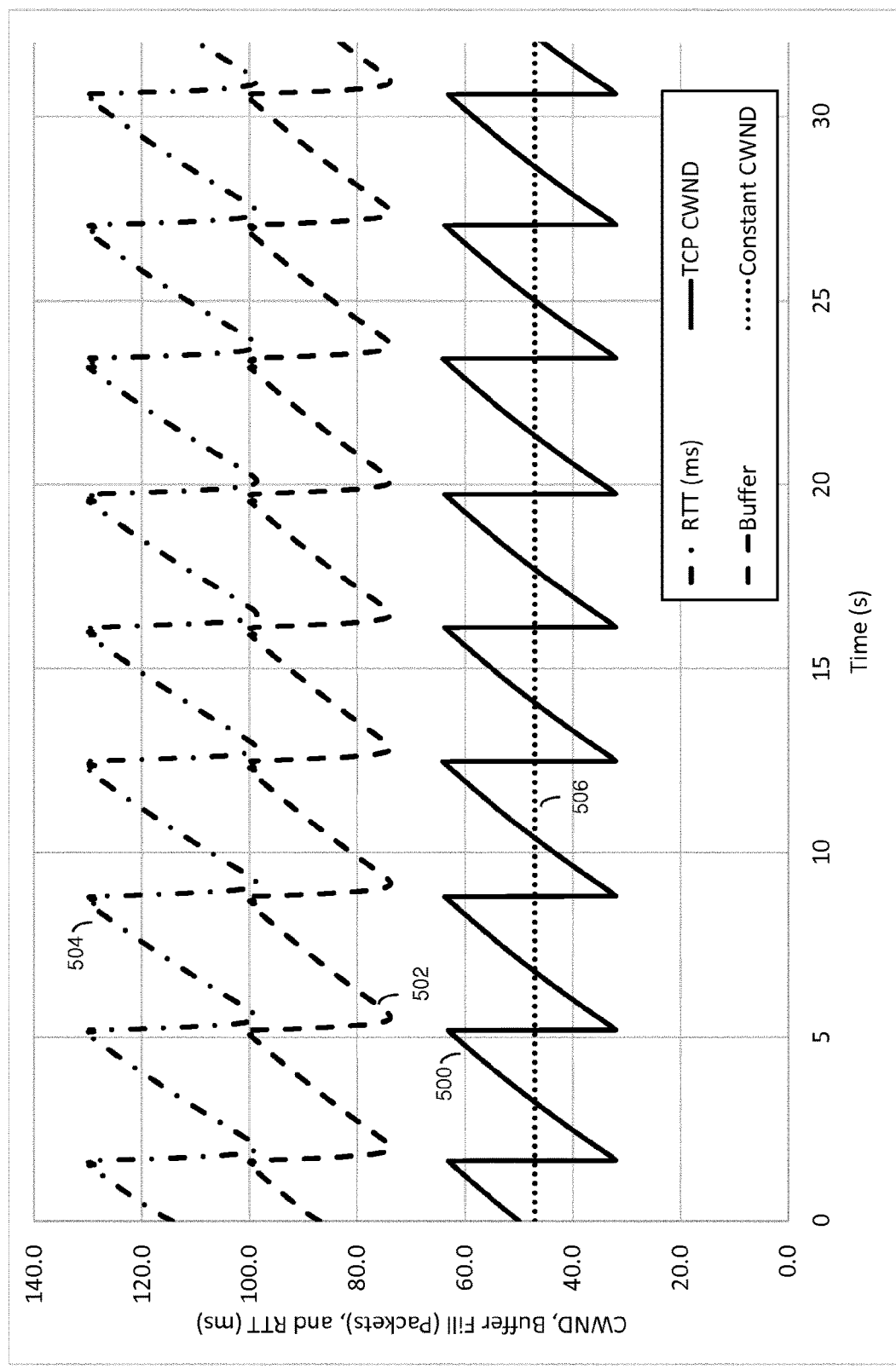
FIG. 5 is a graph showing the variation of congestion window size, buffer fill, and round trip time over time for an example TCP New Reno flow competing with a TCP flow with fixed congestion window size.

FIG. 5 shows the round trip time (RTT) 504, the buffer fill 502, the TCP New Reno congestion window size (TCP CWND) 500, and the fixed congestion window size 506 of 47 packets, for the case of a single TCP New Reno flow competing with a single TCP flow with a fixed congestion window size of 47 packets, through this network configuration.

In a simulation of nearly 20 minutes of transmission (FIG. 5 shows a 30 s section of this), the TCP New Reno flow suffers 1204 packet losses per million packets transmitted. However, the TCP flow with fixed congestion window size suffers 852 packet losses per million packets transmitted, which is notably less than that of the TCP New Reno flow.

The lower level of packet loss observed for the TCP flow with fixed congestion window size can be explained as follows. The two competing flows have approximately the same average congestion window size, the congestion window of the TCP New Reno flow increases as the buffer fills, and is larger than the fixed congestion window size of the other flow at the point in time when the buffer overflows. Although either or both flows may suffer loss, the TCP New Reno flow has more packets 'in flight' making it the more likely of the two flows to suffer packet loss.

Hence a TCP flow with fixed congestion window size can achieve the same throughput as a competing TCP New Reno flow, while suffering lower packet loss. This is generally good for the network as fewer packets need to be retransmitted and less resource is wasted. However, by allowing some variation in in the congestion window size as a function of the measured round trip time, performance can be improved further as set out in examples of the present invention that uses a modified congestion window.

A conventional TCP flow such as TCP New Reno will increase its congestion window size gradually while no packet loss occurs and then reduce it radically. As the congestion window size is increasing towards the point of packet loss, it is likely that the growing congestion window size is causing network buffers to fill, and round trip times to increase.

By measuring round trip time and setting a modified congestion window size that is larger when the round trip time is lower and smaller when the round trip time is higher, a flow can take advantage when network buffers are emptier. That is, when the round trip time is lower, by setting a larger congestion window size the transmission rate is effectively increased, but as network buffers fill and the round trip time increases, a smaller congestion window is used and thus the transmission rate is reduced.

Controlling the congestion window size in this way results in a smaller fall in network buffer fill following a packet loss event than when all flows are conventional TCP flows. This is because the modified TCP flow increases its transmission rate as soon as it infers a fall in network buffer fill, from observation of reduced round trip time. The resulting higher than conventional average network buffer fill causes the average round trip time to increase, which in turn causes the time between buffer overflow events to increase, which implies lower average packet loss rates over all competing flows. And by having a smaller congestion window size at the time of overflow, the modified TCP flow is less likely than other competing flows to suffer packet loss.

Figure 6:
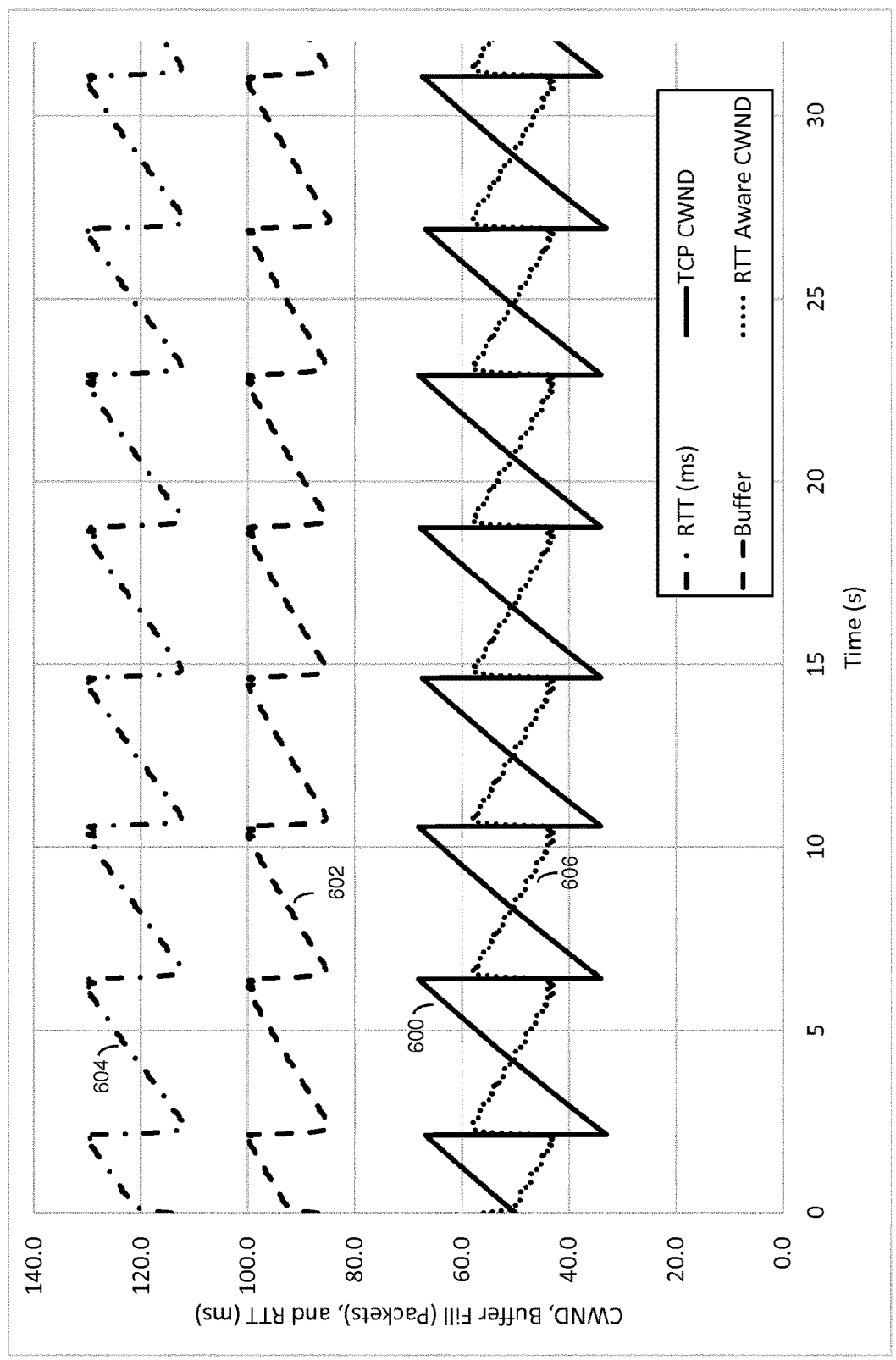
FIG. 6 is a graph showing the variation of congestion window sizes, buffer fill, and round trip time over time for an example TCP New Reno flow competing with a TCP flow with modified congestion window control.

FIG. 6 shows, for a 30 s part of a simulation of nearly twenty minutes of transmission through the same network configuration as FIG. 4, the round trip time (RTT) 604, the buffer fill 602, the TCP New Reno congestion window size (TCP CWND) 600, and the congestion window size of a competing flow using modified congestion window control (RTT Aware CWND) 606, where the competing flow is adjusting its congestion window size according to the measured round trip time.

The parameters of the simulation were again set using an iterative procedure so that the TCP New Reno flow and the competing TCP flow using the modified congestion window achieve approximately the same throughput. The TCP New Reno flow suffers 1141 packet losses per million packets transmitted while the TCP flow using the modified congestion window suffers only 735 packet losses per million packets transmitted.

Hence, instead of keeping the congestion window size constant, but instead adjusting it according to measured values of round trip time, a TCP flow can achieve not only lower packet loss for itself, but also lower packet loss for the competing standard TCP flow.

The congestion window size for a TCP flow that is aware of the round trip time can be set beneficially by any method that sets a relatively high value of congestion window size when the round trip time is relatively low and a relatively low value of congestion window size when the round trip time is relatively high.

In the example illustrated in FIG. 6, the congestion window size for the modified TCP flow was set by linear interpolation between a minimum value, $CWND_{min}$, and a maximum value, $CWND_{max}$, according to the relative value of the measured round trip time, $RTT_{current}$, between a minimum value, $RTT_{min}$, and a maximum value, $RTT_{max}$, of round trip time using equation (1) below:

$$CWND_{modified} = \\ CWND_{min} + (CWND_{max} - CWND_{min}) \times \frac{RTT_{high} - RTT_{current}}{RTT_{high} - RTT_{low}} \quad (1)$$

In the simulation, it was found by an iterative method that a range of 16 packets for the congestion window size gave good performance, and that the range should be from a minimum of 43 to a maximum of 59 packets, to achieve a throughput approximately equal to that of the competing TCP New Reno flow. The values of the minimum and maximum round trip time, $RTT_{min}$ and $RTT_{max}$, were set using an iterative approach, so that the set values were approximately equal to the subsequent measured values.

It has been observed that by setting the congestion window in dependence on the round trip time as described above, the total packet loss can be reduced on a network configuration such as that described above. The amount by which packet loss can be reduced depends on the range over which the modified congestion window is allowed to vary. The packet loss reduction increases as the range increases to an optimal amount, and reduces with further increases in the range. In simulations of the network configuration described above, a 6% reduction of packet loss has been observed when the modified congestion window size was allowed to vary from 45 to 53 packets (approximately +/−8% around the average), a 12% reduction of packet loss when the modified congestion window size could vary from 43 to 59 packets (approximately +1-17% around the average), and smaller amounts of reduction for a larger range over which the modified congestion window size could vary.

As the range over which the modified congestion window size is allowed to vary increases, the average buffer level increases, that is, after a set of packet loss events, the buffer does not fall as far, because the congestion window size increases as soon as a fall in the round trip time, caused by a fall in the buffer level, is detected. The average buffer level being higher causes the average round trip time to be higher, as on average it takes longer for a packet to pass through the buffer. This causes the time between sets of packet loss events to increase as the time for the TCP New Reno congestion window to grow to the extent that it causes buffer overflow is dependent on the round trip time, as that congestion window size increases by one packet every round trip time.

But as the fair share of bandwidth remains the same—it is the same bottleneck bandwidth being shared by the same two flows—the increased average round trip time causes an increased average congestion window size to be required to achieve the same fair share of bandwidth. Hence as the range over which the congestion window size can vary increases, for the flow competing with the TCP New Reno flow, the centre point for that range must increase, to achieve the higher average congestion window size needed to maintain the same average network throughput.

Hence, it is preferred to select the parameters for the variation of the congestion window size, as given in the equation above, using an iterative approach involving measuring the throughput achieved with a given set of parameters, measuring the average congestion window size used and measuring the minimum and maximum round trip time. This will be described in more detail below with reference to the flow chart of FIG. 3.

Figure 3:
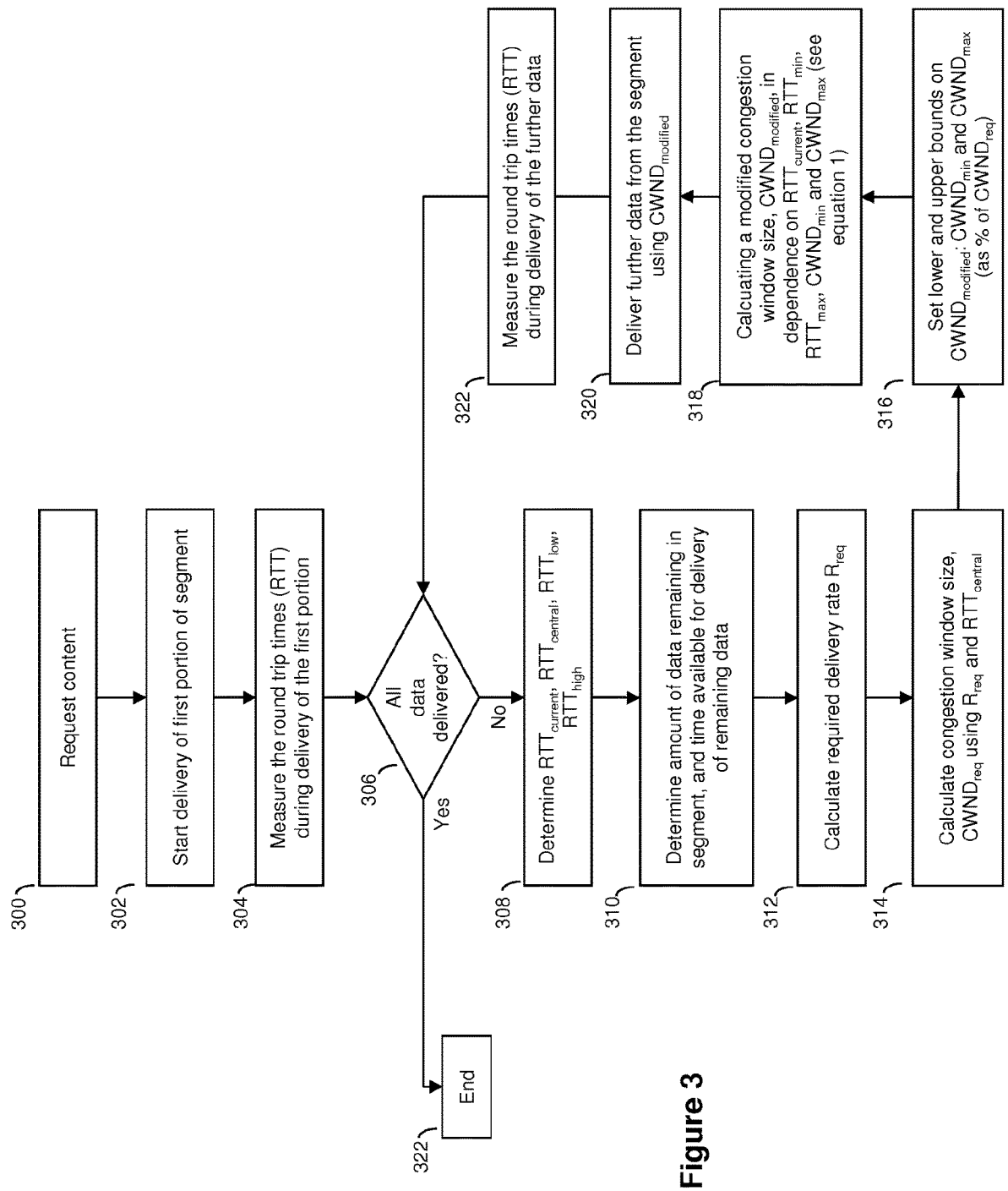
FIG. 3 is a flow chart summarising the steps for a method of content delivery over a network according to an example of the invention.

FIG. 3 is a flow chart outlining the steps of an example of the invention where a modified congestion window is used to deliver data from a server to a client. In this example, the data is media content, such as a piece of video, delivered as part of a streaming session, though the invention could be applied to other types of data such as a file download.

The steps of the example will be described with reference to a segment of content referred to as a 'first segment'. This first segment need not be the first segment in a streaming session between the server and client, and may refer to any segment being communicated as part of a streaming session. A segment can comprise one or more contiguous portions, and examples of the invention describe methods for delivering segments of a media sequence within a specified time interval by adjusting the congestion response following delivery of a portion of each segment, where a portion could be a single packet or multiple packets.

In step 300, a client 108 makes a request for media content by sending a request to the data server 104. The content requests may be HTTP requests e.g. HTTP GET requests. The requested content is comprised of a plurality of segments, each of which comprise a plurality of data packets, as described above. One request may be issued for each segment of media content.

In response to receiving the request, the data server 104 starts delivery of the requested content in step 302. Data packets are transmitted from the data server 104 in succession from an initial or first portion of the first segment. The client 108 may transmit an acknowledgment packet over the network 106 back to the server for each received data packet. Acknowledgment packets can be used by the delivery monitoring unit 218 in the data server 104 to determine the round trip time associated with the delivery of the respective data packet. In this example, where the content is media content, the client 108 can start decoding and playing out the content once sufficient content has been received.

In this example, each segment of content has an associated time interval, $\Delta T_n$, for delivering the segment n to the client 108 over the network 106. The Applicant's International application WO2014/155031 describes TCP congestion control in which the TCP congestion window is controlled during the delivery of a segment of data to ensure that the segment of data is delivered within a specified time interval, and in which the packet loss is monitored during delivery, and in which the measured packet loss during the delivery of one or more preceding segments is used to calculate constraints on the congestion window to be used for delivery of the next segment of data.

For example, the specified time interval may be set to a relatively short time for content streaming applications where content needs to be delivered within a certain time to prevent play-out stalling. Conversely, for a file download, where a user does not require a file urgently, the specified time interval may be set to a relatively long time.

The time interval for delivering the content segment to the client 108 over the network 106 may be specified by the client. For example, the client may append to the server request for a content segment an indication of the time by which delivery of that segment is desired. Alternatively, the time interval for delivery may be specified by the server 104. The server may specify the time interval for delivery based on a consideration of delivering the content as a whole to the client 108 in a timely fashion with minimal latency. This type of content delivery, in which the server specifies the time interval for delivery of a content segment, may be referred to as HTTP push, with the server 104 being said to implement an HTTP push mechanism.

Turning back to step 302, delivery of the first portion of the segment can be controlled using any conventional implementation of TCP, which may include a phase known as slow start, in which two packets can be transmitted for each acknowledgment packet received, and which may include other phases such as congestion avoidance, where the congestion window is increased during periods without packet loss, although some other initial start process could be used.

Next, in step 304, during delivery of the first portion, the round trip time (RTT) associated with the delivery of each data packet is measured by the data server 104 using acknowledgement packets received from the client 108.

Then, in step 306, the data server checks to see if all the requested data has been delivered. If all the data has been delivered, then processing ends in step 322. If not, then processing passes to step 308.

Then, in step 308, the data server 104 uses the RTTs measured in step 304 (or from step 322 if available) to determine the following RTTs: the RTT associated with the most recently delivered data packet, $RTT_{current}$; an average RTT, $RTT_{central}$, a low RTT, $RTT_{low}$; and a high RTT, $RTT_{high}$. $RTT_{current}$ is the is RTT associated with the most recently successfully delivered data packet, that is the most recent data packet in the segment that has had an acknowledgement packet received. $RTT_{central}$ can be determined as the average or mean RTT over all the RTTs measured in step 304, the median of the RTTs or a specified fraction between $RTT_{low}$ and $RTT_{high}$, such as the midpoint. $RTT_{low}$ can be determined as the lowest value of all the RTTs from step 304, with $RTT_{high}$ being the highest value of all the RTTs from step 304.

Then, in step 310, the data server 104 determines the amount of data remaining in the segment that has yet to be delivered $D_{remaining}$, as well as the time available $\Delta T_d$ for delivery of that remaining data. Note, $\Delta T_d$ is effectively equal to $\Delta T_n$ minus the time elapsed since delivery commenced in step 302.

In step 312, the delivery rate, $R_{req}$, required to ensure that the content data segment is delivered by the deadline is calculated as per equation (2) below in terms of the amount of data within the content data segment remaining to be delivered, $D_{remaining}$, and the time interval remaining $\Delta T_d$.

$$R_{req} = \frac{D_{remaining}}{\Delta T_d} \quad (2)$$

In step 314, a required congestion window size $CWND_{req}$ is calculated by the data server 104, where $CWND_{req}$ is the fixed congestion window size (as described with reference to FIG. 5 above) required to deliver the remaining data $D_{remaining}$ within the time interval remaining $\Delta T_d$, using $R_{req}$ and $RTT_{central}$. The required congestion window size $CWND_{req}$ is calculated as per equation (3) below:

$$CWND_{req} = R_{req} \times RTT_{central} \quad (3)$$

However, as described above, it is beneficial to adjust the congestion window according to measured round trip times rather than keeping it constant. Therefore, the maximum and minimum congestion windows, $CWND_{max}$ and $CWND_{min}$, are set by the data server 104. In this example, $CWND_{max}$ and $CWND_{min}$ may be set as a percentage offset from $CWND_{req}$. For example, $CWND_{max}$ may be set to 8% higher than $CWND_{req}$ and $CWND_{min}$ may be set to 8% lower than $CWND_{req}$. Other percentage offsets, such as 17%, could be used. And the percentage offsets do not need to be symmetrical around $CWND_{req}$.

Then in step 318, the data server 104 uses equation (1) to calculate the modified congestion window size $CWND_{modified}$, which is set out as a linear interpolation between $CWND_{min}$ and $CWND_{max}$ according to the measured round trip time $RTT_{current}$ relative to the minimum value, $RTT_{min}$, and the maximum value, $RTT_{max}$.

Thus, using the method above, as the round trip times of delivered packets increases or decreases, the modified congestion window size also changes according to equation (1).

Once $CWND_{modified}$ has been calculated, it is used to deliver further data from the remainder of the segment in step 320 by the data server 104, and in step 322, the RTTs associated with the delivery of each data packet of the further data is measured by the data server 104 using acknowledgement packets received from the client 108.

Processing then passes back to step 306, where a check is made by the data server to determine whether all the data requested by the client 108 has been delivered. If not, then an updated modified congestion window is calculated, using the data delivered thus far (including the new RTTs from step 322) to calculate revised parameters in steps 308 to step 318, before further data is delivered using the updated modified congestion window in step 320, and so on, until all the data has been delivered.

The above examples have been described with reference to a modified TCP protocol, but a person skilled in the art will appreciate that the invention could equally be used to modify other delivery protocols such as QUIC.

The above examples have been described in the context of a server delivering segments of media content to a client over a network. The server could be an origin server, a content delivery network (CDN) node or a residential gateway device, for example. More generally, the functions of the server described herein may be implemented by a suitably configured transmitter for delivering media content over the network. The clients may be HTTP adaptive bit rate streaming clients. The clients may be adapted to support MPEG DASH, HLS, SmoothStreaming or some other adaptive bit rate streaming protocol. More generally, the clients may be any suitable configured receiver for receiving media content over a network.

Generally, any of the functions, methods, techniques or components described above for the components of the communication system can be implemented in software, firmware, hardware (e.g., fixed logic circuitry), or any combination thereof. The terms "unit", "detector" and "calculator" as used herein may generally represent software, firmware, hardware, or any combination thereof. In the case of a software implementation, the unit, detector and calculator represent computer program code or computer readable instructions that perform the specified tasks when executed on a processor. The algorithms and methods described herein could be performed by one or more processors executing code that causes the processor(s) to perform the algorithms/methods. The computer program code may be stored on a non-transitory computer-readable storage medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of delivering content from a server to a client over a network, said content comprising a plurality of temporal segments having an associated time available for delivery, and each of the temporal segments comprising a plurality of data packets, said method comprising:
    a) delivering a first portion of a temporal segment from the server to the client;
    b) measuring a plurality of round trip times associated with delivery of at least the first portion;
    c) determining a current round trip time, a central round trip time, a lower round trip time, and an upper round trip time from the plurality of round trip times, wherein the current round trip time is a round trip time associated with delivery of a most recent packet, the lower round trip time is a round trip time having a value lower than a value of the upper round trip time, and the central round trip time has a value between the values of the lower round trip time and the upper round trip time;
    d) calculating a required congestion window size needed to deliver the data remaining in the temporal segment within the time available to deliver the data remaining in the temporal segment, wherein the calculation of the required congestion window size is dependent on the central round trip time, an amount of the data remaining in the temporal segment that has yet to be delivered, and an amount of the time available to deliver the data remaining in the temporal segment;
    e) calculating a modified congestion window size, where the modified congestion window size falls within a range set around the required congestion window size, and where the modified congestion window size is relatively high when the current round trip time is close to the lower round trip time, and the modified congestion window size is relatively low when the current round trip time is close to the upper round trip time;
    f) delivering further data from the remainder of the temporal segment using the modified congestion window size from the server to the client;
    g) measuring a plurality of round trip times associated with delivery of the further data from the remainder of the temporal segment; and
    h) repeating steps c) to f) using at least the plurality of round trip times from step g).

2. The method as set out in claim 1, wherein the modified congestion window size falls between a minimum congestion window size and a maximum congestion window size that are set as a percentage offset from the required congestion window size.

3. The method as set out in claim 1, wherein the lower round trip time is a lowest value of the measured round trip times, and the higher round trip time is a highest value of the measured round trip times.

4. A server for delivering content over a network to a client, said content comprising a plurality temporal segments having an associated time available for delivery, and each of the temporal segments comprising a plurality of data packets, said adapted in operation to:
    a) deliver a first portion of a temporal segment from the server to the client;
    b) measure a plurality of round trip times associated with delivery of at least the first portion;
    c) determine a current round trip time, a central round trip time, a lower round trip time, and an upper round trip time from the plurality of round trip times, wherein the current round trip time is a round trip time associated with delivery of a most recent packet, the lower round trip time is a round trip time having a value lower than a value of the upper round trip time, and the central round trip time has a value between the values of the lower round trip time and the upper round trip time;
    d) calculate a required congestion window size needed to deliver the data remaining in the temporal segment within the time available to deliver the data remaining in the temporal segment, wherein the required congestion window size is dependent on the central round trip time;
    e) calculate a modified congestion window size, where the modified congestion window size falls within a range set around the required congestion window size, and where the modified congestion window size is relatively high when the current round trip time is close to the lower round trip time, and the modified congestion window size is relatively low when the current round trip time is close to the upper round trip time;

f) deliver further data from the remainder of the temporal segment using the modified congestion window size from the server to the client;

g) measure a plurality of round trip times associated with delivery of the further data from the remainder of the temporal segment; and h) repeat c) to f) using at least the plurality of round trip times from g);

wherein the modified congestion window size, CWND$_{modified}$, is calculated by:

$$CWND_{modified} = CWND_{min} + (CWND_{max} - CWND_{min}) \times \frac{RTT_{high} - RTT_{current}}{RTT_{high} - RTT_{low}}$$

where CWND$_{min}$ is a minimum congestion window size, CWND$_{max}$ is a maximum congestion window size, RTT$_{high}$ is the higher round trip time, RTT$_{low}$ is the lower round trip time, and RTT$_{current}$ is the current round trip time.

5. The method of claim 1, wherein:
the lower round trip time is a lowest value of the measured round trip times, and the higher round trip time is a highest value of the measured round trip times; and
the central round trip time is determined as a mean round trip time over the measured plurality of round trip times or determined as a median round trip time over the measured plurality of round trip times.

6. The method of claim 1, wherein:
the lower round trip time is a lowest value of the measured round trip times, and the higher round trip time is a highest value of the measured round trip times; and
the central round trip time is determined as a specified fraction between the lower round trip time and the higher round trip time.

7. The method of claim 1, wherein the time available to deliver the data remaining in the temporal segment is the time available for delivery of the temporal segment minus the time elapsed since data delivery started for the temporal segment.

8. The method of claim 1, wherein:
wherein the calculation of the required congestion window size is dependent on the central round trip time, the amount of the data remaining in the temporal segment that has yet to be delivered, and the amount of the time available to deliver the data remaining in the temporal segment; and
the central round trip time is determined as a mean round trip time over the measured plurality of round trip times or determined as a median round trip time over the measured plurality of round trip times.

9. The method as set out in claim 1, wherein the modified congestion window size falls between a minimum congestion window size and a maximum congestion window size, and the calculation of the modified congestion window size includes a determination of a linear interpolation between the minimum congestion window size and the maximum congestion window size.

10. A method of delivering content from a server to a client over a network, said content comprising a plurality of temporal segments having an associated time available for delivery, and each of the temporal segments comprising a plurality of data packets, said method comprising:

a) delivering a first portion of a temporal segment from the server to the client;

b) measuring a plurality of round trip times associated with delivery of at least the first portion;

c) determining a current round trip time, a central round trip time, a lower round trip time, and an upper round trip time from the plurality of round trip times, wherein the current round trip time is a round trip time associated with delivery of a most recent packet, the lower round trip time is a round trip time having a value lower than a value of the upper round rip time, and the central round trip time has a value between the values of the lower round trip time and the upper round trip time;

d) calculating a required congestion window size needed to deliver the data remaining in the temporal segment within the time available to deliver the data remaining in the temporal segment, wherein the required congestion window size is dependent on the central round trip time;

e) calculating a modified congestion window size, where the modified congestion window size falls within a range set around the required congestion window size, and where the modified congestion window size is relatively high when the current round trip time is close to the lower round trip time, and the modified congestion window size is relatively low when the current round trip time is close to the upper round trip time;

f) delivering further data from the remainder of the temporal segment using the modified congestion window size from the server to the client;

g) measuring a plurality of round trip times associated with delivery of the further data from the remainder of the temporal segment; and h) repeating steps c) to f) using at least the plurality of round trip times from step g);

wherein the modified congestion window size, CWND$_{modified}$, is given by:

$$CWND_{modified} = CWND_{min} + (CWND_{max} - CWND_{min}) \times \frac{RTT_{high} - RTT_{current}}{RTT_{high} - RTT_{low}}$$

where CWND$_{min}$ is a minimum congestion window size, CWND$_{max}$ is a maximum congestion window size, RTT$_{high}$ is the higher round trip time, RTT$_{low}$ is the lower round trip time, and RTT$_{current}$ is the current round trip time.

11. A server for delivering content over a network to a client, said content comprising a plurality temporal segments having an associated time available for delivery, and each of the temporal segments comprising a plurality of data packets, said adapted in operation to:

a) deliver a first portion of a temporal segment from the server to the client;

b) measure a plurality of round trip times associated with delivery of at least the first portion;

c) determine a current round trip time, a central round trip time, a lower round trip time, and an upper round trip time from the plurality of round trip times, wherein the current round trip time is a round trip time associated with delivery of a most recent packet, the lower round trip time is a round trip time having a value lower than a value of the upper round trip time, and the central round trip time has a value between the values of the lower round trip time and the upper round trip time;

d) calculate a required congestion window size needed to deliver the data remaining in the temporal segment within the time available to deliver the data remaining in the temporal segment, wherein the calculation of the required congestion window size is dependent on the central round trip time, an amount of the data remaining in the temporal segment that has yet to be delivered, and an amount of the time available to deliver the data remaining in the temporal segment;

e) calculate a modified congestion window size, where the modified congestion window size falls within a range set around the required congestion window size, and where the modified congestion window size is relatively high when the current round trip time is close to the lower round trip time, and the modified congestion window size is relatively low when the current round trip time is close to the upper round trip time;

f) deliver further data from the remainder of the temporal segment using the modified congestion window size from the server to the client;

g) measure a plurality of round trip times associated with delivery of the further data from the remainder of the temporal segment; and h) repeat c) to f) using at least the plurality of round trip times from g).

12. The apparatus of claim 11, wherein the modified congestion window size falls between a minimum congestion window size and a maximum congestion window size that are set as a percentage offset from the required congestion window size.

13. The apparatus of claim 11, wherein the lower round trip time is a lowest value of the measured round trip times, and the higher round trip time is a highest value of the measured round trip times.

14. The apparatus of claim 11, wherein the modified congestion window size is calculated using a minimum congestion window size, a maximum congestion window size, the higher round trip time, the lower round trip time, and the current round trip time.

15. The apparatus of claim 11, wherein:
the lower round trip time is a lowest value of the measured round trip times, and the higher round trip time is a highest value of the measured round trip times; and
the central round trip time is determined as a mean round trip time over the measured plurality of round trip times or determined as a median round trip time over the measured plurality of round trip times.

16. The apparatus of claim 11, wherein:
the lower round trip time is a lowest value of the measured round trip times, and the higher round trip time is a highest value of the measured round trip times; and
the central round trip time is determined as a specified fraction between the lower round trip time and the higher round trip time.

17. The apparatus of claim 11, wherein the time available to deliver the data remaining in the temporal segment is the time available for delivery of the temporal segment minus the time elapsed since data delivery started for the temporal segment.

18. The apparatus of claim 11, wherein the modified congestion window size is calculated using a minimum congestion window size, a maximum congestion window size, the higher round trip time, the lower round trip time, and the current round trip time.

19. The apparatus of claim 11, wherein:
wherein the calculation of the required congestion window size is dependent on the central round trip time, the amount of the data remaining in the temporal segment that has yet to be delivered, and the amount of the time available to deliver the data remaining in the temporal segment; and
the central round trip time is determined as a mean round trip time over the measured plurality of round trip times or determined as a median round trip time over the measured plurality of round trip times.

20. The apparatus of claim 11, wherein:
wherein the modified congestion window size falls between a minimum congestion window size and a maximum congestion window size, and the calculation of the modified congestion window size includes a determination of a linear interpolation between the minimum congestion window size and the maximum congestion window size.

* * * * *